Figure 1:
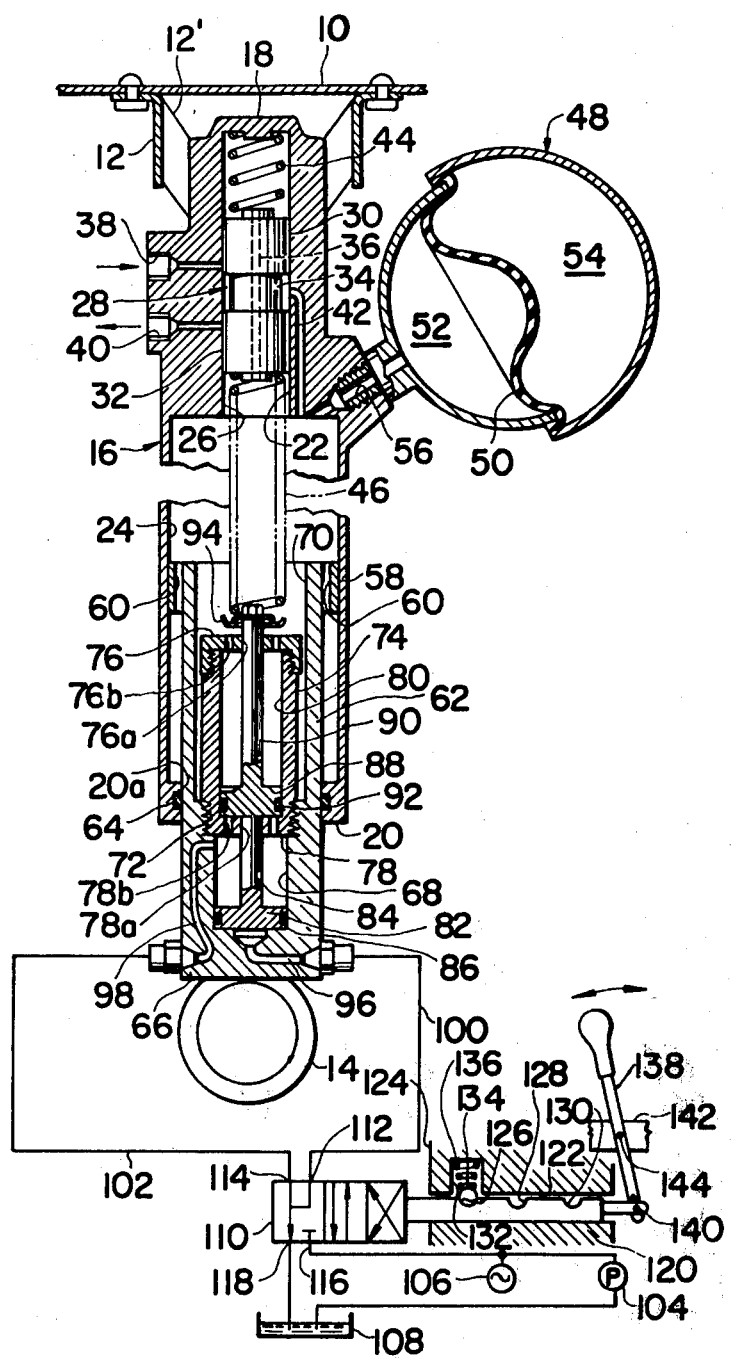

United States Patent [19]

Hiruma

[11] 3,941,403

[45] Mar. 2, 1976

[54] HYDRO-PNEUMATIC SUSPENSION UNIT

[75] Inventor: Mituo Hiruma, Kodaira, Japan

[73] Assignee: Nissan Motor Co., Ltd., Yokohama, Japan

[22] Filed: Mar. 13, 1975

[21] Appl. No.: 557,947

[30] Foreign Application Priority Data

Mar. 19, 1974  Japan.............................. 49-30564

[52] U.S. Cl. .......................... 280/124 F; 267/65 D
[51] Int. Cl.² ...................................... B60G 15/00
[58] Field of Search ....... 280/124 F, 6 H; 267/65 D, 267/64 R, 64 A, 65 R; 137/625.6, 625.68, 624.27

[56] References Cited
UNITED STATES PATENTS

| | | | |
|---|---|---|---|
| 3,797,140 | 3/1974 | McWilliams | 267/65 D X |
| 3,840,245 | 10/1974 | Aikawa | 280/124 F |

Primary Examiner—Philip Goodman

[57] ABSTRACT

Herein disclosed is a hydro-pneumatic self-levelling suspension unit for an automotive vehicle, serving not only as a shock-absorber responsive to jounces and rebounds of a vehicle body and a self-levelling mechanism capable of automatically adjusting the height of the vehicle body responsive to change in the load applied to the vehicle body but as a level selector mechanism which is manually operated to stepwise vary the height of the vehicle body. The level selector mechanism comprises means stepwise extensible in an axial direction of the suspension unit between a fully contracted position and a fully extended position and biased toward the fully contracted position. The extensible means is stepwise extended to one or more lengths between the fully contracted and extended positions by selective application of fluid pressure thereon.

7 Claims, 5 Drawing Figures

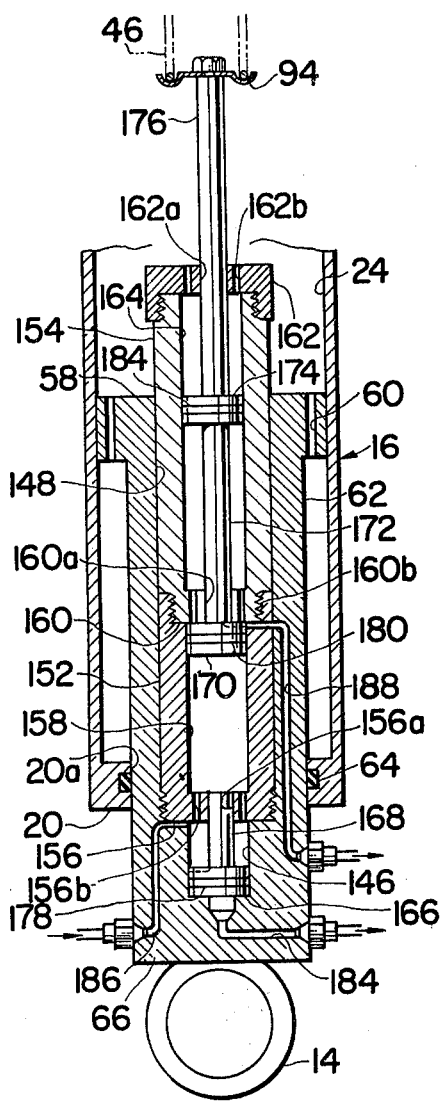
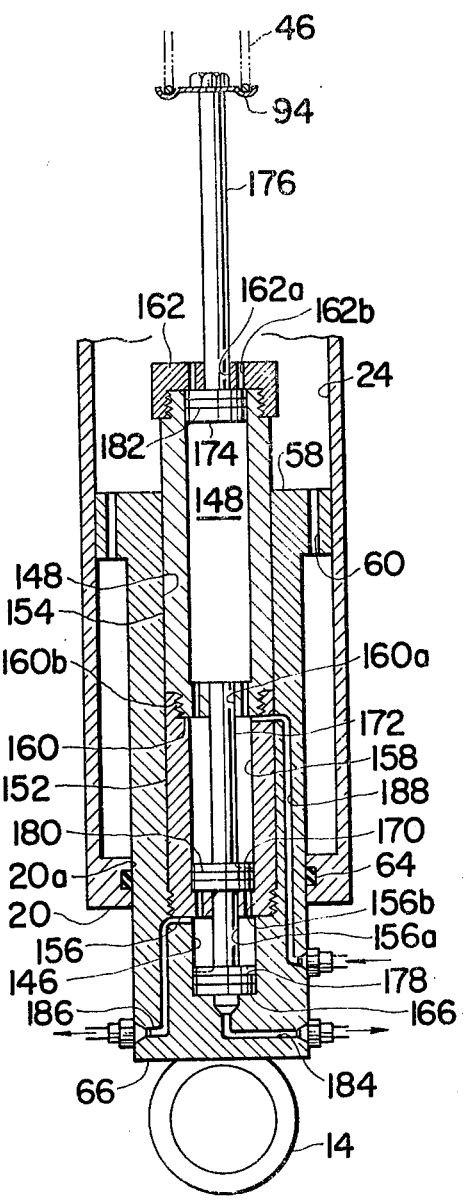

HYDRO-PNEUMATIC SUSPENSION UNIT

The present invention relates to a suspension system of an automotive vehicle and, more particularly, to a hydro-pneumatic vehicle suspension system of the self-levelling type. The self-levelling hydro-pneumatic vehicle suspension system includes one or more hydro-pneumatically operating suspension units or struts each of which is rigidly connected at an upper end to a suspended part of the vehicle body structure and at a lower end to a wheel axle. When the suspension unit or strut is over-compressed responsive to lowering of the vehicle body over road surface, fluid under pressure is supplied to the strut and controls the strut to be extended to a normal length. When, on the contrary, the suspension strut is over-extended responsive to rise of the vehicle body over the road surface, then the working fluid is discharged from the strut so that the strut is compressed to the normal length. The vehicle body is in this fashion automatically level-adjusted in accordance with variation in the suspended weight of the vehicle and is constantly maintained at a prescribed level over the road surface irrespective of the variation in the amount of load applied to the suspension system.

The suspension unit or strut of the above mentioned general character has incorporated therein a self-levelling valve which is responsive to jounce and rebound of road wheels of the vehicle as caused when the vehicle encounters road irregularities. The self-levelling valve is cooperative with a piston slidable in a cylinder and is biased by suitable resilient biasing means such as a combination of preload springs toward an equilibrium position providing the normal length of the strut.

In some of the self-levelling suspension systems thus arranged, particularly in modernized versions of such suspension systems, the suspension unit or strut is further provided with a manual level selector mechanism which is adapted to vary the normal length of the suspension strut by a manual operation so that the normal height of the vehicle body over road surface can be adjusted from the driver's seat depending upon the load on the vehicle and/or the conditions of the road surface. A typical example of such a level selector mechanism uses a cylindrical member engaging the resilient biasing means for the self-levelling valve and axially movable in a cylindrical bore which is formed in the piston. The cylindrical member is associated with a hydraulic control unit and is driven to axially move in the piston when the hydraulic control unit is manually actuated by the driver of the vehicle whereby the biasing force applied to the self-levelling valve by the resilient biasing means is varied.

Two different design choices are available in the level selector mechanism thus arranged. One is an arrangement in which the cylindrical member is subjected to a fixed amount of working fluid for being moved a predetermined distance and the other is an arrangement in which the cylindrical member is formed with an axial bore and slidably receives in the axial bore a second or inner cylindrical member so that the two cylindrical members are subjected to fluid pressure one after another. Drawbacks are encountered in the arrangement of the former design in that the level of the vehicle is apt to fluctuate responsive to slight leakage of the working fluid to act on the cylindrical member and in that a complex combination of mechanical parts must be provided to supply a fixed amount of working fluid to the level selector mechanism at all times the normal height of the vehicle body is to be changed. Because, on the other hand, the two cylindrical members are positioned coaxially in the axial bore in the piston in the arrangement of the latter design, the piston and accordingly the suspension unit as a whole tend to be disproportionately large sized. The present invention contemplates elimination of all these problems that have been inhereint in the prior art self-levelling hydro-pneumatic vehicle suspension systems having the manual level selector mechanisms of the described designs.

It is, therefore, an important object of the present invention to provide a self-levelling hydro-pneumatic vehicle suspension system including at least one suspension unit with an improved manually-operated level selector arrangement which is capable of reliably and accurately adjusting the level of the vehicle body irrespective of fluctuation of the fluid pressure to be directed to the selector arrangement and which will dispense with strict control of the working fluid to be developed in the selector arrangement.

It is another important object of the present invention to provide a self-levelling and manually-adjustable hydro-penumatic vehicle suspension system which has a simple and small-sized construction and which is economical to manufacture.

In accordance with the present invention, these and other objects will be accomplished generally in a hydro-pneumatic suspension system which includes at least one suspension unit comprising first and second cylindrical members which are telescopically connected together and which are axially movable relative to each other, self-levelling valve means disposed in the first cylindrical member and having a first position operative to direct fluid pressure into the first and second cylindrical members for causing the first and second cylindrical members to axially move relative to each other in directions to axially extend the suspension unit and a second position operative to discharge the fluid pressure from the first and second cylindrical members for causing the first and second cylindrical members to axially move relative to each other in directions to axially contract the suspension unit, resilient biasing means disposed in the first cylindrical member and engaging the valve means for biasing the valve means toward an equilibrium position between the first and second positions of the valve means thereby holding the suspension unit in a balanced condition, hydro-pneumatic spring means operative to compensate for fluctuations in the fluid pressure in the first and second cylindrical members, valve actuating means disposed in the second cylindrical member and engaging the valve means through the resilient biasing means, the valve actuating means being stepwise extensible in an axial direction of the second cylindrical member between a fully contracted length and a fully extended length for actuating the valve means through the resilient biasing means into the first position thereof responsive to extension of the valve actuating means and into the second position thereof responsive to contraction of the valve actuating means, the valve actuating means being biased toward the fully contracted length partly by the resilient biasing means and partly by the fluid pressure in the first and second cylindrical members, fluid supply means having a plurality of operative positions for supplying working fluid to the valve actuating means and causing the valve actuating means to be selectively stepwise extended or contracted between the fully contracted length and the fully extended length thereof, and manually-operated control means for manually actuating the fluid supply means selectively into any of the operative positions thereof.

The valve actuating means engaging the self-levelling valve means in the hydro-neumatic suspension unit thus constructed substantially in line with each other in the second cylindrical member and which are engageable end-to-end with each other, each of the plungers being axially movable between a first extreme position remotest from the valve means and a second extreme position closest to the valve means, the plunger located closest to the valve means being connected to the resilient biasing means, the fully contracted length of the valve actuating means being achieved with all of the plungers held in the first extreme positions thereof and the fully extended length of the valve actuating means being achieved with the plunger remotest from the valve means held in the first extreme position thereof and with the plunger closest to the valve means held in the second extreme position thereof, the plunger closest to the valve means being stepwise moved between the first and second extreme positions thereof by the fluid pressure developed in the valve actuating means by the working fluid directed to the actuating means from the fluid supply means, the working fluid from the fluid supply means being applied to at least one of the plungers which is selected depending upon the operative position selected in the fluid supply means.

The valve actuating means may further comprise cylindrical wall means fast on the second cylindrical member and defining a plurality of axial bores which are axially arrayed substantially in line with each other in the second cylindrical member and in which the plungers are respectively axially slidable and lateral wall means including an apertured intermediate wall separating axially adjacent two of the axial bores from each other, a lateral end wall forming part of the second cylindrical member and defining an axial end of the axial bore located remotest from the self-levelling valve means and an apertured end wall defining an axial end of the axial bore located closest to the valve means, the walls providing stop means defining the first and second extreme positions of the plungers, the apertured intermediate wall being formed with an opening in which the plunger in remoter one of the adjacent two axial bores to the valve means is axially slidably received and engageable with the plunger in the other of the adjacent two axial bores, the apertured end wall being formed with an opening through which the plunger in the axial bore located closest to the valve means axially projects toward the valve means and connected to the resilient biasing means.

The valve actuating means may still further comprise wall portions formed with fluid passageways leading from the fluid supply means and including a first fluid passageway terminating at the axial end of the axial bore remotest from the self-levelling valve means for moving the plunger in the axial bore from the first extreme position to the second extreme position when the working fluid is directed into the first fluid passageway, and at least one second fluid passageway terminating intermediate between the axially adjacent two of the axial bores for moving the plunger in the remoter one of the two axial bores from the valve means from the second extreme position to the first extreme position thereof and simultaneously moving the plunger in the other of the two axial bores from the first extreme position toward the second extreme position thereof when the working fluid is directed into the second fluid passageway.

Figure 2A:
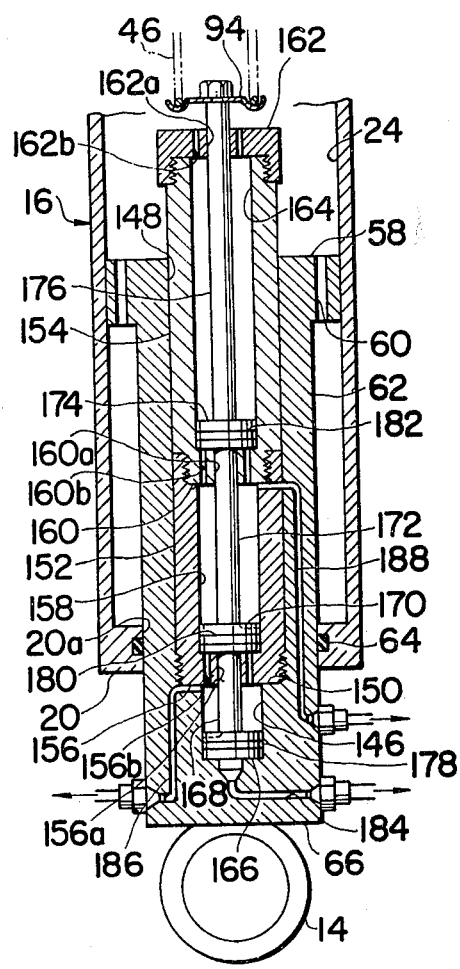
Figure 2B:
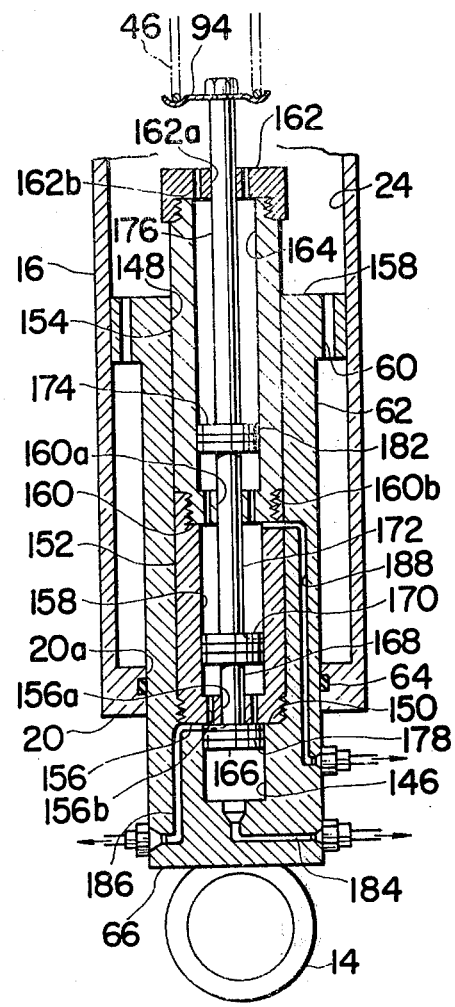

Other features and advantages of the hydro-pneumatic self-levelling suspension unit according to the present invention will become apparent from the following description taken in conjunction with the accompanying drawings in which like reference numerals and characters designate corresponding or similar members and in which:

FIG. 1 is a longitudinal sectional view which shows a first preferred embodiment of the hydro-pneumatic self-levelling suspension unit according to the present invention, the suspension unit being shown in a fully contracted balanced condition; and FIGS. 2a, 2b, 2c and 2d are longitudinal sectional views which show lower portions of a second preferred embodiment of the hydro-pneumatic self-levelling suspension unit according to the present invention, wherein FIG. 2a shows a fully contracted balanced condition of the suspension unit, FIG. 2b shows a first extended balanced condition of the suspension unit, FIG. 2c shows a second extended balanced condition of the suspension unit, and FIG. 2d shows a third or fully extended balanced condition of the suspension unit.

Reference will now be made to the drawings, first to FIG. 1 which shows a first preferred embodiment of the self-levelling and manually-adjustable hydro-pneumatic vehicle suspension system according to the present invention. The suspension system includes a hydro-pneumatically operative suspension unit which is connected at an upper end to a suspended part 10 of a vehicle body structure through a bracket 12 and an elastic support member 12' and at a lower end to an axle (not shown) of a road wheel of the vehicle through a rigid connecting ring 14.

The suspension unit comprises a cylinder 16 which has a closed upper end wall 18 and an open lower end wall 20 which is formed with a circular opening 20a. The cylinder 16 is formed with an axial bore extending between the inner faces of the upper and lower end walls 18 and 20. The axial bore consists of a cylindrical valve chamber 22 terminating at the inner face of the closed upper end wall 18 and a cylindrical piston chamber 24 terminating at the inner face of the open lower end wall 20 of the cylinder 16. The valve chamber 22 is adjacent to the piston chamber 24 through a radially outwardly stepped edge portion 26 of the cylinder 16 and is smaller in diameter than the piston chamber 24 as shown. A self-levelling valve member 28 in the form of a spool is axially slidably received in the valve chamber 22. The valve member 28 has first and second, or upper and lower, cylindrical lands 30 and 32 which have substantially equal diameters and which axially spaced apart from each other so as to form a circumferential groove 34 therebetween. The valve member 28 is formed with an axial passageway 36 extending throughout the axial length of the valve member 28 so as to provide constant communication between the spaces which are formed on both sides of the valve member 28 in the valve chamber 22.

The cylinder 16 is further formed with fluid inlet and outlet ports 38 and 40 which are open into the valve member 28. The open ends of the fluid inlet and outlet ports 38 and 40 are located and, at the same time, the cylindrical lands 30 and 32 of the valve member 28 are arranged in such a manner that the open ends of the fluid inlet and outlet ports 38 and 40 are covered by the first and second cylindrical lands 30 and 32, respectively, when the valve member 28 is held in a shown axial position (which will be hereinafter referred to as a normal equilibrium position of the valve member 28). When the valve member 28 is axially upwardly moved in the valve chamber 22 from the equilibrium position illustrated, then the first or upper cylindrical land 30 clears the fluid inlet port 38 with the fluid outlet port 40 kept closed by the second or lower cylindrical land 32 so that the fluid inlet port 38 is open into the circumferential groove 34 in the valve member 28. When, conversely, the valve member 28 is axially downwardly moved from the equilibrium position illustrated, then the second or lower cylindrical land 32 clears the fluid outlet port 40 with the fluid inlet port 38 kept closed by the first or upper cylindrical land 30 so that the fluid outlet port 40 is in communication with the circumferential groove 34 in the valve member 28. The valve member 28 is, thus, axially movable in the valve chamber 22 between a first axial position opening the fluid inlet port 38 and closing the fluid outlet port 40 and a second axial position closing the fluid inlet port 38 and opening the fluid outlet port 40 through the above mentioned equilibrium position. The cylinder 16 is formed with a passageway 42 which is adapted to provide constant communication between the circumferential groove 34 in the valve member 28 and the piston chamber 24. The piston chamber 24 is, thus, permitted to communicate with the fluid inlet port 38 when the valve member 28 is in the first axial position thereof and with the fluid outlet port 40 when the valve member 28 is in the second axial position thereof. Because of the provision of the axial passageway 36 which is open at the opposite axial ends of the valve member 28 and because of the fact that the lands 30 and 32 have substantially equal cross sectional areas, the valve member 28 is subjected to no differential pressure when a fluid pressure is developed in the valve chamber 22.

The self-levelling valve member 28 is biased toward the equilibrium position thereof by means of first and second preload springs 44 and 46 which are herein shown as compression springs. The first preload spring 44 is seated at one end on the inner face of the closed upper end wall 18 of the cylinder 16 and at the other end on an end face of the first cylindrical land 30 of the valve member 28, urging the valve member 28 axially away from the upper end wall 18. The second compression spring 46 is seated at one end on an end face of the second cylindrical land 32 of the valve member 28 and axially extends into the piston chamber 24, urging the valve member 28 toward the upper end wall 18 of the cylinder 16.

To the cylinder 16 is rigidly connected a generally spherical container 48 constituting a pneumatic spring of the suspension unit 10. The spherical container 48 is internally divided by a flexible partition member 50 into two chambers 52 and 54. One chamber 52 is herein called a fluid chamber and is in constant communication with the piston chamber 24 in the cylinder 16 through a passageway 56. The other chamber 54, herein called a gas chamber, is a fluid-tight enclosure and is filled with air or other gas under pressure.

A cylindrical piston 58 is axially slidably received in the piston chamber 24 in the cylinder 16. The piston 58 is formed with a plurality of passageways 60 extending throughout the axial length of the piston 58, providing constant communication between the spaces formed on both sides of the piston 58 in the piston chamber 24. The piston 58 has a piston rod portion 62 which extends downwardly through the piston chamber 24 and which projects axially outwardly from the cylinder 16 through the opening 20a formed in the lower end wall 20 of the cylinder. In the circumferential wall defining the opening 20a in the lower end wall 20 is embedded an annular seal element 64 so that the piston chamber 24 is hermetically sealed off. The piston 58 is formed with an axial bore which is open at an upper end to the piston chamber 24 in the cylinder 16 and terminates at an inner face of a lower end wall 66 of the piston rod portion 62 projecting from the cylinder 16. The axial bore thus formed in the piston 58 consists of first and second or lower and upper bore sections 68 and 70 which are separated from each other by an intermediate bore section 72. The intermediate bore section 72 has a diameter which is larger than the diameter of the first or lower bore section 68 and smaller than the diameter of the second or upper bore section 70. The intermediate bore section 72 is thus defined by a peripheral wall portion which is radially inwardly stepped at its lower axial end adjacent the first bore section 68 and radially outwardly stepped at its upper axial end adjacent the second bore section 70. The second bore section 70 is longer than the first bore section 68 for the reason to be described later. The above mentioned peripheral wall portion defining the intermediate bore section 72 is internally threaded and has screwed thereto a cylindrical member 74 through an externally threaded bottom portion of the cylindrical member 74. The cylindrical member 74 thus fixedly positioned in the axial bore in the piston 58 axially projects into the second or upper bore section 70 and has upper and lower end walls 76 and 78, the upper end wall 76 being located below the upper end of the axial bore in the piston 58 and the lower end wall 78 having an outer face defining an upper end of the first or lower bore section 68. The upper and lower end walls 76 and 78 are formed with central openings 76a and 78a, respectively, which are substantially aligned in an axial direction of the bore in the piston 58. The cylindrical member 74 is thus formed with an axial bore 80 extending between the inner faces of the upper and lower end walls 76 and 78. The axial bore 80 is a diameter equal to the diameter of the first or lower bore section 68 in the piston 58 and an axial length larger than the axial length of the first or lower bore section 68 as illustrated. The upper end wall 76 of the cylindrical member 74 is formed with a plurality of apertures 76b providing constant communication between the axial bore 80 in the cylindrical member 74 and the second or upper bore section 70 in the piston 58. Likewise, the lower end wall 78 of the cylindrical member 74 is formed with a plurality of apertures 78b extending between the faces of the end wall 78.

A first plunger 82 is axially slidably received in the first or lower bore section 68 in the piston 58. The first plunger 82 has a rod portion 84 extending axially upwardly, viz., away from the lower end wall 66 of the rod portion 62 of the piston 58 and axially slidably received in the central opening 78a in the lower end wall 78 of the cylindrical member 74. The length of the rod portion 84 of the plunger 82 is such that the rod portion 84 has its leading upper end substantially flush with the inner face of the lower end wall 78 of the cylindrical member 74 or, in other words, located at the lower end of the axial bore 80 in the cylindrical member 74 when the plunger 82 is in a lowermost position in the first bore section 68 with the lower end face of the plunger 82 in contact with the inner face of the lower end wall 66 of the piston 58 as illustrated. When the plunger 82 is moved axially upwardly in the first bore section 68 away from the lower end wall 66 of the piston 58, the rod portion 84 of the plunger 82 axially projects into the axial bore 80 in the cylindrical member 74. Between the sliding surface of the plunger 82 and the inner peripheral surface of the piston rod portion 62 defining the first bore section 68 is provided an annular seal element 86 which is shown to be received in a circumferential race formed in the plunger.

A second plunger 88 is axially slidably received in the axial bore 80 in the cylindrical member 74. The second plunger 88 has a rod portion 90 extending axially upwardly, viz., away from the lower end wall 78 of the cylindrical member 74 and axially slidably received in the central opening 76a in the upper end wall 76 of the cylindrical member 74. The rod portion 90 projects axially outwardly or upwardly from the central opening 76a in the end wall 76 and terminates above the upper face of the end wall 76 and below the upper end of the piston 58 when the plunger 88 is located in a lowermost position in the axial bore 80 with its lower end face in contact with the upper face of the lower end wall 78 of the cylindrical member 74 as illustrated. When the second plunger 88 is thus held in the lowermost position in the cylindrical member 74, the plunger 88 is engaged at its lower end face by the leading end of the rod portion 84 of the first plunger 82 which is also held in the lowermost position in the first or lower bore section 68 in the piston 58 as shown. When the second plunger 88 is moved axially upwardly in the axial bore 80 in the cylindrical member 74, the rod portion 90 of the second plunger 88 axially projects from the upper end of the piston 58 into the piston chamber 24 in the cylinder 16 and is moved toward the self-levelling valve member 28 in the valve chamber 22 which is located above the valve chamber 24. Between the sliding surface of the second plunger 88 and the inner peripheral surface of the cylindrical member 74 is disposed an annular seal element 86. The second plunger 88 is equal in diameter to the first plunger 82 but is axially longer than the first plunger 82 as will be understood from the foregoing description.

The second plunger 88 thus arranged has fixedly carried at the leading end of its rod portion 90 a disc-shaped spring seat member 94 which is located above the outer face of the upper end wall 76 of the cylindrical member 74 when the second plunger 88 is held in its lowermost position in the axial bore 80 in the cylindrical member 74, as shown. The previously mentioned second preload spring 46 seated at one end on the lower end face of the self-levelling valve member 28 is seated at the other end on the upper face of the disc-shaped spring seat member 94, urging the valve member 28 and the second plunger 88 axially away from each other across the piston chamber 24 against an opposing force of the first preload spring 44 which is seated on the upper end face of the valve member 28. When both of the first and second plungers 82 and 88 are held in their respective lowermost positions as illustrated, the self-levelling valve member 28 is maintained in the previously mentioned equilibrium position with its first and second cylindrical lands 30 and 32 held in axial positions closing the fluid inlet and outlet ports 38 and 40, respectively, by the forces of the first and second preload springs 44 and 46 which are in conditions equally balanced with each other. The springs 44 and 46 should be designed to achieve this effect. When both of the first and second plungers 82 and 88 are upwardly moved in unison from their respective lowermost positions or only the second plunger 88 is upwardly moved from the lowermost positions or only the second plunger 88 is upwardly moved from the lowermost position with the first plunger 82 held in the lowermost position, the spring seat member 94 on the rod portion 90 of the second plunger 88 is moved toward the self-levelling valve member 28 so that the second preload spring 46 is axially compressed and urges the valve member 28 away from the piston chamber 24 by an increased force. As a consequence, the self-levelling valve member 28 is axially moved toward the upper end wall 18 of the cylinder 16 against the opposing force of the first preload spring 44. When the valve member 28 reaches the previously mentioned first axial position having its first cylindrical land 30 located past the leading end of the fluid inlet port 38, communication is provided between the fluid inlet port 38 and the fluid passageway 42 through the circumferential groove 34 in the valve member 28. Working fluid is thus admitted from the fluid inlet port 38 into the axial bore in the cylinder 16 through the fluid passageway 42 and acts on the piston 58, which is consequently moved axially downwardly away from the valve member 28. The rod portion 62 of the piston 58 is caused to project downwardly so that the suspended unit as a whole is axially extended. The second preload spring 46 is thus permitted to extend to its initial length and allows the valve member 28 to move axially downwardly away from the upper end wall 18 of the cylinder 16 under the influence of the biasing force of the first preload spring 44. When the second preload spring 46 resumes its initial length, the valve member 28 is moved back into its equilibrium position and closes the fluid inlet port 38 by the first cylindrical land 30 thereof. An increased amount of fluid under pressure is now confined in the cylinder 16 and the suspension unit is maintained in the extended condition by the increased amount of fluid in the cylinder 16.

The rod portion 62 of the piston 58 is formed with first and second fluid passageways 96 and 98. The first fluid passageway 96 is open at the inner end of the lower end wall 66 of the piston rod portion 62 and the second fluid port 98 is open into an upper end portion of the first or lower bore section 68 in the piston rod portion 62. Thus, fluid under pressure directed into the first fluid passageway 96 acts on the lower end face of the first plunger 82 in the first or lower bore section 68 and urges the first plunger 82 to move axially upwardly away from the lower end wall 66 of the piston rod portion 62, moving the second plunger 88 axially upwardly away from the lower end wall 78 of the cylindrical member 74. Both of the first and second plungers 82 and 88 are moved upwardly by the fluid pressure directed into the first fluid passageway 96. On the other hand, fluid directed into the second fluid passageway 98 acts on the upper faces of the first plunger 82 and, through the apertures 78b formed in the lower end wall 78 of the cylindrical member 74, acts on the lower end face of the second plunger 88 in the axial bore 80 in the cylindrical member 74. As a consequence, the first plunger 82 is urged downwardly and thus forced against the inner face of the lower end wall 66 of the piston rod portion 62 and, at the same time, the second plunger 88 is axially moved upwardly away from the inner face of the lower end wall 78 of the cylindrical member 74 and is disengaged from the upper end of the rod portion 84 of the first plunger 82. Development of fluid pressure in the second fluid passageway 98 brings about upward movement of only the second plunger 88. In the absence of working fluid in both of the fluid passageways 96 and 98, the first and second plungers 82 and 88 are held in their respective lowermost positions and are forced against the inner faces of the lower end walls 66 and 78 of the piston rod portion 62 and the cylindrical member 74, respectively, partly by the biasing force of the first and second preload springs 44 and 46 and partly by the fluid pressure which acts on the second plunger 88 through the apertures 76b formed in the upper end wall 76 of the cylindrical member 74.

The first and second fluid passageways thus formed in the rod portion 62 of the piston 58 are in communication with fluid supply means through first and second fluid feed lines 100 and 102, respectively. The fluid supply means comprise a fluid feed pump 104, a fluid pressure accumulator 106, a fluid reservoir 108 and a three-position control valve 110 which has first and second ports 112 and 114 from which the above mentioned first and second fluid feed lines 100 and 102 lead respectively. The three-position control valve 110 further has a fluid inlet port 116 in communication with the discharge port of the fluid feed pump 104 through the fluid pressure accumulator 106 and a drain port 118 leading to the fluid reservoir 108. The fluid feed pump 104 is usually driven by the prime mover of the vehicle and has a suction port leading from the reservoir 108. The discharge port of the pump 104 is also in communication with the fluid inlet port 38 in the cylinder 16 through the pressure accumulator 106 and, furthermore, the fluid outlet port 40 in the cylinder 16 is in communication with the reservoir 108, though not shown in the drawing. The three-position control valve 110 has a first operative position having the first and second ports 112 and 114 in communication with the drain port 118, a second operative position providing communication between the first port 112 and the inlet port 116 and communication between the second port 114 and the drain port 118, and a third operative position providing communication between the first port 112 and the drain port 118 and communication between the second port 114 and the inlet port 116. When, thus, the three-position control valve 110 is in the first operative position, the first and second fluid feed lines 100 and 102 are drained off so that no fluid pressure is developed in the first and second fluid passageways 96 and 98 in the piston 58. When the three-position control valve 110 is in the second operative position, the fluid supplied from the fluid feed pump 104 is directed into the first fluid feed line 100 with the second fluid feed line 102 drained off so that fluid pressure develops in the first fluid passageway 96 in the piston 58. When the three-position control valve 110 is in the third operative position thereof, then the fluid from the pump 104 is directed to the second fluid feed line 102 with the first fluid feed line 100 drained off so that fluid pressure is developed only in the second fluid passageway 98 in the piston 58.

The three-position control valve 110 is shifted between these three different operative positions by manually-operated valve actuating means. The valve actuating means comprise an elongate control member 120 which is axially slidable through a bore 122 formed in a stationary member 124 which may form part of the vehicle body structure. The elongate control member 120 is formed with three semispherical recesses 126, 128 and 130 which are arrayed and spaced apart from each other in an axial direction of the control member 120. The stationary member 124 thus receiving the elongate control member 120 is formed with a cavity 132 which is open to the bore 122. The cavity 132 has accommodated therein a spherical locking member 134 which is forced against the elongate control member 120 by means of a preload spring 136 which is also mounted in the cavity 132. When the elongate control member 120 is axially moved through the bore 122 and one of the three semispherical recesses 126, 128 and 130 in the control member 120 is aligned with the cavity 132, the spherical locking member 134 in the cavity 132 is forcibly received in the particular recess by the force of the preload spring 136 and maintains the control member 120 in the particular axial position. The elongate control member 120 is thus axially movable between first, second and third axial positions receiving the spherical locking member 134 in the first, second and third semispherical recesses 126, 128 and 130, respectively. The control member 120 is connected at one end to an actuating element (not shown) of the three-position control valve 110 and actuates the valve 110 into the previously mentioned first, second and third operative positions when moved to the above mentioned first, second and third axial positions, respectively. The control member 120 is connected at the other end to a control lever 138 through a pivotal pin 140. The control lever 138 is pivotally mounted on a stationary support member 142 through a pivotal pin 144 providing a fulcrum of the lever 138. The control lever 138 is thus rotatable about the pivotal pin 144 between three different angular position providing the three axial positions of the elongate control member 120. The control lever 138 is preferably located in the neighborhood of the driver's seat of the vehicle and is manually actuated by the vehicle driver when it is desired to vary the level of the vehicle body over road surface.

The operation of the hydro-pneumatic suspension unit thus constructed and arranged will be hereinafter described.

When the vehicle encounters a road irregularity during cruising and the road wheels of the vehicle jounce and rebound on the road surface, the suspension unit is urged in its entirety to vertically contract or extend and accordingly the cylinder 16 and the piston 58 are axially moved relative to each other so that the fluid confined in the cylinder 16 is subjected to a varied pressure. The varied pressure thus applied to the fluid in the cylinder 16 is transferred through the passageway 56 to the fluid in the fluid chamber 52 in the spherical container 48 constituting the pneumatic spring and is applied to the flexible partition member 50. The gas chamber 54 filled with gas, which is compressible, is therefore expanded or contracted and compensates for the variation in the pressure applied to the fluid in the cylinder 16. In this instance, the self-levelling valve member 28 is maintained in the equilibrium position closing both of the fluid inlet and outlet ports 38 and 40 because substantially no differential fluid pressure is imparted to the valve member 28 and because no fluid pressure is being developed in both of the fluid inlet and outlet ports 96 and 98 with the control lever 138 held in the previously mentioned first angular position. The impacts exerted on the cylinder 16 and the piston 58 by the jounce and rebound of the vehicle body are dampened out by the flows of fluid across the piston 58 through the restricted axial passageways 60 formed in the piston 58. Thus, the suspension unit acts simply as a shock absorber responsive to the jounce and rebound of the vehicle encountering a road irregularity.

When, on the other hand, the load exerted on the vehicle body is changed as a result of, for example, a change in the number of occupants of the vehicle, the suspension unit is also caused to vertically contract or extend so that the cylinder 16 and the piston 58 are axially moved relative to each other. The piston 58 and accordingly the first and second plungers 82 and 88 movable with the piston 58 are consequently axially moved relative to the self-levelling valve member 28 with a resultant change in the force of the second preload spring 46 which is either compressed or extended from the initial condition thereof. If, under these conditions, the amount of displacement of the piston 58 relative to the self-levelling valve member 28 is greater than a certain limit, then the valve member 28 is axially moved out of the equilibrium position into the first or second axial position thereof, thereby opening the fluid inlet port 38 or the fluid outlet port 40. Either the fluid inlet port 38 or the fluid outlet port 40 is thus permitted to communicate with the differential groove 34 in the valve member 28. If, in this instance, the suspension unit is contracted responsive to lowering of the vehicle body as caused by an increase in the load on the vehicle body, the piston 58 and the self-levelling valve member 28 are moved closer to each other with the second preload spring 46 compressed from its initial length so that the valve member 28 is axially moved relative to the piston 58 from the equilibrium position into the first axial position thereof having the first cylindrical land 30 located past the leading end of the fluid inlet port 38 and the second cylindrical land 32 held in an axial position covering the leading end of the fluid outlet port 40. The fluid inlet port 38 is thus permitted to communicate with the circumferential groove 34 in the self-levelling valve member 28, providing fluid communication between the fluid inlet port 38 and the axial bore in the cylinder 16 through the circumferential groove 34 in the valve member 28 and the fluid passageway 42 in the cylinder wall. Additional working fluid is thus admitted into the axial bore in the cylinder 16 from the fluid inlet port 38 and causes the cylinder 16 and the piston 58 to axially move relative to each other in directions to extend the suspension unit to an initial length. When the initial length is achieved by the suspension unit, the second compression spring 46 also restores its initial length and allows the self-levelling valve member 28 to return to the equilibrium position thereof under the influence of the biasing force exerted thereon by the first preload spring 44. The fluid inlet port 38 is consequently closed for a second time by the first cylindrical land 30 of the self-levelling valve member 28 and ceases to feed the additional working fluid to the cylinder 16. The suspension unit is, in this manner, maintained in a first balanced condition having a length which is dictated by the first angular position of the manually-operated control lever 138. If, conversely, the suspension unit is extended responsive to rising of the vehicle body over road surface as caused by a decrease in the load on the vehicle body, the piston 58 and the self-levelling valve unit 28 are moved away from each other so that the second preload spring 46 is extended from the initial length thereof. As a consequence, the self-levelling valve member 28 is axially moved relative to the piston 58 from the equilibrium position into the second axial position thereof having the second cylindrical land 32 located past the leading end of the fluid outlet port 40 and the first cylindrical land 30 held in an axial position covering the leading end of the fluid inlet port 40. The fluid outlet port 40 is thus permitted to communicate with the circumferential groove 34 in the self-levelling valve member 28 and provides fluid communication between the axial bore in the cylinder 16 and the fluid outlet port 40 through the fluid passageway 42 in the cylinder wall and the circumferential groove 34 in the valve member 28. The working fluid in the axial bore in the cylinder 16 is thus discharged from the fluid outlet port 40 and permits the cylinder 16 and the piston 58 to axially move relative to each other in directions to shorten the suspension unit by means of the suspended weight of the vehicle body. When the suspension unit is compressed to the initial length thereof, the second compression spring 46 also restores the initial length thereof and allows the self-levelling valve member 28 to move back to the equilibrium position thereof against the opposing force of the first preload spring 44. The fluid outlet port 40 is for a second time isolated from the circumferential groove 34 in the self-levelling valve member 28 and accordingly from the axial bore in the cylinder 16 and ceases to discharge the working fluid from the cylinder 16. The previously mentioned first balanced condition or length is thus restored by the suspension unit. The suspension unit thus operates as a self-levelling mechanism for the vehicle body responsive to change in the amount of load exerted on the vehicle body.

With the manually-operated control lever 138 held in the first angular position thereof, the elongate control member 120 connected between the control lever 138 and the actuating element (not shown) of the three-position control valve 110 is maintained in the previously mentioned first axial position receiving the spherical locking member 134 in the first semi-spherical recess 126. Under these conditions, the three-position control valve 110 is maintained in the first operative position thereof causing the first and second ports 112 and 114 to communicate with the drain port 118. The first and second plungers 82 and 88 in the piston 58 are, therefore, maintained in their respective lowermost axial positions in the absence of fluid pressure in the first and second passageways 96 and 98.

When the manually-operated control lever 138 is driven by the vehicle driver to turn clockwise of FIG. 1 about the pivotal pin 144 from the first angular position into the second angular position thereof, the elongate control member 120 is driven to axially move leftwardly of the drawing from the first axial position to the second axial position thereof, receiving the spherical locking member 134 in the second semispherical recess 128 and locked in the second axial position. The three-position control valve 110 is thus shifted from the first operative position to the second operative position and provides communication between the first port 112 and the fluid inlet port 116 with the second port 114 kept connected to the drain port 118. The fluid delivered from the pump 104 is directed to the first fluid feed line 100 through the fluid accumulator 106 is admitted to the first fluid passage 96 formed in the rod portion 62 of the piston 58. The fluid pressure developed in the first fluid passageway 96 acts on the lower end face of the first plunger 82 and moves the plunger 82 axially upwardly in the first or lower bore section 68 in the piston rod portion 62. The first plunger 82, in turn, moves the second plunger 88 axially upwardly in the axial bore 80 in the cylindrical member 74. The rod portion 90 of the second plunger 88 thus projects axially upwardly from the upper end wall 76 of the cylindrical member 74 and causes the second preload spring 46 to be compressed. The upward movement of the first and second plungers 82 and 88 is terminated when the first plunger 82, which is shorter than the second plunger 88 as previously noted, is brought into abutting engagement with the outer face of the lower end wall 78 of the cylindrical member 74. The lower end wall 78 of the cylindrical member 74 thus serves as stop means for limiting the upward movement of the first and second plungers 82 and 88 from their respective lowermost positions. The first and second plungers 82 and 88 being thus moved upwardly a distance substantially equal to the axial length of the first or lower bore section 68 in the piston rod portion 62, the rod portion 90 of the second plunger 88 axially upwardly projects beyond the upper end of the piston 58 and causes the second preload spring 46 to be compressed and to urge the self-levelling valve member 28 toward the upper end wall 18 of the cylinder by an increased force. The self-levelling valve member 28 is therefore axially upwardly moved against the opposing force of the first preload spring 44 from the equilibrium position into the first axial position thereof, having the first cylindrical land 30 located upwardly past the leading end of the fluid inlet port 38 and second cylindrical land 32 held in the position closing the fluid outlet port 40. Communication is now established between the fluid inlet port 38 and the axial bore in the cylinder 16 so that additional working fluid is directed from the fluid inlet port into the axial bore in the cylinder through the circumferential groove 34 in the valve member 28 and the fluid passageway 42 in the cylinder wall. It therefore follows that the cylinder 16 and the piston 58 are axially moved relative to each other in direction to extend the suspension unit. When the suspension unit is extended a length corresponding to the axial displacement of the first and second plungers 82 and 88, viz., the axial length of the first or lower bore section 68 in the piston rod portion 62, the second compression spring 46 restores its initial length with the first and second plungers 82 and 88 maintained in their raised axial positions. The self-levelling valve member 28 is thus allowed to return from the first axial position to the equilibrium position thereof by the force of the first preload spring 44, closing the fluid inlet port 38 by the first cylindrical land 30 thereof. The suspension unit is in this manner brought into a second balanced condition supporting the vehicle body at a level which is raised from the lowermost normal level achieved when the suspension unit is in the first balanced position previously mentioned. During the second balanced condition of the suspension unit, the first and second plungers 82 and 88 are maintained in their respective raised axial positions with the first plunger 82 held in contact with the outer face of the lower end wall 78 of the cylindrical member 74 and with the second plunger 88 in contact with the leading end of the rod portion 84 of the first plunger 82 by the fluid pressure acting in opposite directions on the first and second plungers 82 and 88 which have substantially equal fluid working areas. The raised axial position which the second plunger 82 assumes during the second balanced condition of the suspension unit is herein referred to as a first axially raised position of the second plunger 88.

When it is desired to have the vehicle body further lifted over road surface for one reason or another, the manually-operated control lever 138 is further rotated clockwise of the drawing about the pivotal pin 144 from the second angular position to the first angular position thereof by the vehicle driver. The elongate control member 120 is consequently moved further leftwardly of the drawing from the second axial position to the third axial position thereof, receiving the spherical locking member 134 in the third semispherical recess 130 therein and thereby locked in the third axial position. The three-position control valve 110 is now actuated from the second operative position into the third operative position thereof and provides communication between the second port 114 and the fluid inlet port 116 with the first port 112 left communicating with the drain port 118. The working fluid supplied from the fluid feed pump 140 is thus directed through the fluid pressure accumulator 106 to the second fluid feed line 102 and is admitted into the second fluid passageway 98 in the rod portion 62 of the piston 58. Fluid pressure is developed in the axial bore section 68 above the fluid working face of the first plunger 82 so that the first plunger 82 is axially moved downwardly away from the outer face of the lower end wall 78 into the lowermost position thereof and is forced against the inner face of the lower end wall 66 of the piston rod portion 62. The fluid pressure directed from the second fluid passageway 98 into the first or lower bore section 68 in the piston rod portion 62 is admitted through the apertures 78b in the lower end wall 78 of the cylindrical member 74 into the lower portion of the axial bore 80 in the cylindrical member 74 and acts on the lower end face of the second plunger 88 which has been held in the first axially raised position in the cylindrical member 74. The second plunger 88 is therefore moved axially upwardly from the first axially raised position toward the self-levelling valve member 28 in the valve chamber 22. The upward movement of the second plunger 88 is terminated when the second plunger 88 is brought into abutting engagement with the inner face of the upper end wall 76 of the cylindrical member 74. The upper end wall 76 of the cylindrical member 74 thus serves as stop means to limit the upward movement of the second plunger 88. The axial position achieved in this manner by the second plunger 88 is herein referred to as a second axially raised position of the plunger 88. When the second plunger 88 is thus moved into the second axially raised position, the second preload spring 46 connected to the second plunger 88 is axially compressed from the initial length thereof and urges the self-levelling valve member 28 to axially move upwardly from the equilibrium position against the opposing force of the first preload spring 44. When the self-leveling valve member 28 reaches the first axial position thereof, the fluid inlet 38 is permitted to communicate with the circumferential groove 34 in the valve member 28 with the fluid outlet port 40 kept closed by the second cylindrical land 32 of the valve member 28. Communication is therefore established between the fluid inlet port 38 and the axial bore in the cylinder 16 so that the cylinder 16 and the piston 58 are axially moved relative to each other in the directions to further extend the suspension unit from the second balanced condition, allowing the second preload spring 46 to restore the initial length thereof. When the second preload spring 46 thus restores its initial length, the self-levelling valve member 28 is allowed to return from the first axial position to the initial equilibrium position thereof closing the fluid inlet port 38 by the first cylindrical land 30 thereof under the influence of the biasing force of the first preload spring 44. The fluid communication between the fluid inlet port 38 and the axial bore in the cylinder 16 is thus interrupted by the first cylindrical land 30 of the self-levelling valve member 28 so that the suspension unit is maintained in a third balanced condition having a maximum axial length. The vehicle body is now lifted to the highest level available over road surface. The third balanced condition of the suspension unit is maintained with the second plunger 88 held in the second axially raised position because of the equal fluid pressures acting in opposite directions on the plunger 88.

To have the vehicle body lowered from the highest available level achieved in this manner, the manually-operated control lever 138 is rotated counterclockwise of the drawing about the pivotal pin 144 from the third angular position to the second angular position thereof by the vehicle driver. The elongate control member 120 is moved rightwardly of the drawing from the third axial position to the second axial position thereof and receives the spherical locking member 134 in the second semispherical recess 128 therein. The three-position control valve 110 is shifted from the third operative position to the second operative position thereof, providing communication between the first fluid port 122 and the fluid inlet port 116 and communication between the second port 114 and the drain port 118. The fluid in the second fluid passageway 98 is consequently discharged into the fluid reservoir 108 through the second fluid feed line 102 and the second port 114 and the drain port 118 of the three-position valve 110 with the result that the second plunger 88 is cleared of the fluid pressure which has been acting on the lower end face thereof and is thus moved axially downwardly from the second axially raised position thereof. At the same time as the second plunger 88 is thus moved downwardly from the second axially raised position thereof, the fluid supplied from the fluid feed pump 140 is directed into the first fluid passageway 96 in the piston rod portion 62 through the fluid pressure accumulator 106, the inlet port 116 and the first port 112 of the three-position control valve 110 and the first fluid feed line 100 and causes the first plunger 82 to move axially upwardly from the lowermost position thereof. The first plunger 82 is thus brought into abutting engagement with the outer face of the lower end wall 78 of the cylindrical member 74 and receives at the leading or upper end of its rod portion 84 the lower end face of the second plunger 88 lowered from the second axially raised position thereof. The second plunger 88 is consequently held in the first axially raised position thereof. Under these conditions, the second preload spring 46 is extended from the initial length thereof so that the self-levelling valve 28 in the valve chamber 22 is caused to move axially downwardly from the equilibrium position thereof by the force of the first preload spring 44. When the self-levelling valve member 28 is moved into the second axial position thereof, the second cylindrical land 30 of the valve member 28 is located downwardly past the fluid outlet port 40 with the first cylindrical land 30 of the valve member 28 in an axial position closing the fluid inlet port 38. Fluid communication is now established between the fluid outlet port 40 and the circumferential groove 34 in the self-levelling valve member 28 and accordingly between the axial bore in the cylinder 16 and the fluid outlet port 40 through the passageway 42 in the cylinder wall and the circumferential groove 34 in the valve member 28. The working fluid in the axial bore in the cylinder 16 is discharged through the fluid outlet port 40 so that the cylinder 16 and the piston 58 are axially moved relative to each other by the suspended weight of the vehicle body in directions in which the suspension unit is vertically contracted from the third balanced condition, causing the second preload spring 46 to be compressed toward the initial length thereof. When the second preload spring 46 thus restores the initial length thereof, the self-levelling valve member 28 is axially moved upwardly from the second axial position into the equilibrium position thereof and closes the fluid oulet port 40 by the second cylindrical land 32 thereof, thereby blocking the fluid communication between the axial bore in the cylinder 16 and the fluid outlet port 40. The suspension unit is in this manner brought into the second balanced condition thereof with the first plunger 82 held in the uppermost axial position thereof and the second plunger 88 held in the first axially raised position thereof by the fluid pressure obtaining in the first fluid passageway 96 in the piston rod portion 62.

If, then, the manually-operated control lever 138 is further rotated counterclockwise of the drawing about the pivotal pin 144 from the second angular position to the first angular position thereof, the elongate control member 120 is moved rightwardly of the drawing from the second axial position to the first axial position, receiving the spherical locking member 134 in the first semispherical recess 126 therein. The three-position control valve 110 is now shifted from the second operative position to the first operative position and causes not only the second port 114 but the first port 112 to communicate with the drain port 118. The fluid which has been directed into the first fluid passageway 96 in the piston rod portion 62 is consequently discharged into the fluid reservoir 108 through the first fluid feed into line 100 and the first port 112 and the drain port 118 of the three-position control valve 110. The first plunger 82 is thus cleared of the fluid pressure which has been acting on the lower end face thereof and is moved axially downwardly into the lowermost position thereof by the second plunger 88 which is axially moved downwardly from the first axially raised position into the lowermost position thereof by the fluid pressure in the axial bore 80 in the cylindrical member 74. With the first and second plungers 82 and 88 thus moved into the lowermost positions thereof as illustrated, the second preload spring 46 is for a second time extended from the initial length thereof and allows the self-levelling valve member 28 to move axially downwardly from the equilibrium position into the second axial position thereof, opening the fluid outlet port 40 with the fluid inlet port 38 kept closed by the first cylindrical land 30 thereof. The working fluid in the axial bore in the cylinder 16 is consequently discharged through the fluid passageway 42 in the cylinder wall, the circumferential groove 34 in the self-levelling valve member 28 and the fluid outlet port 40 so that the cylinder 16 and the piston 58 are axially moved relative to each other by the suspended weight of the vehicle body in directions to have the suspension unit contracted from the second balanced condition thereof. As the suspension unit is thus vertically compressed, the second preload spring 46 is also axially compressed toward the initial length thereof and allows the self-levelling valve member 28 to axially upwardly move from the second axial position to the equilibrium position thereof against the opposing force of the first preload spring 44. The fluid outlet port 40 is therefore closed by the second cylindrical land 32 of the self-levelling valve member 28 so that the fluid communication between the axial bore in the cylinder 16 and the fluid outlet port 40 is blocked. The suspension unit is in this manner brought into the first balanced condition as illustrated in FIG. 1 and as a consequence the vehicle body is maintained at its lowermost normal level.

It is apparent that the suspension unit thus far described acts as the shock absorber or the self-levelling mechanism not only during the first balanced condition but during the second and third balanced conditions of the suspension unit if impacts are transferred to the suspension unit as a result of the jounces and rebounds of the vehicle encountering road irregularities or if the load on the vehicle body is changed. Although, moreover, the suspension unit is shown in FIG. 1 as having the cylinder 16 connected to the suspended part 10 of the vehicle body structure and the rod portion 62 of the piston 58 connected to the wheel axle, this is merely by way of example and, thus, the suspension unit having the construction shown in FIG. 1 may be connected at the leading end of the piston rod portion 62 to the suspended weight 10 of the vehicle body structure through, for example, the rigid bracket 12 and the elastic support member 12' and at the leading end of the cylinder 16 to the wheel axle (not shown) through, for example, the rigid ring member 14 if preferred. In this instance, the expressions "upper," "lower," "raised" and "lowered" and the expressions similar to these as herein used to explain the various movements and relative positions of the members constituting the suspension unit should be construed inversely to the meanings inhereint in such expressions.

The embodiment of the suspension unit which has thus far been described with reference to FIG. 1 is adapted to stepwise vary the height of the vehicle body between three different levels over road surface by manual operations. It will be, however, understood that the embodiment shown in FIG. 1 can be readily modified so as to be operative to stepwise vary the height of the vehicle body between only two different levels or between more than three different levels over road surface. FIGS. 2a to 2d illustrate an embodiment of the suspension unit which is adapted to vary the height of a vehicle body between four different levels over road surface. Thus, the suspension unit shown in FIGS. 2a to 2d can be shifted between first to fourth balanced conditions.

In FIGS. 2a to 2d, only the lower portion of the suspension unit is shown for the sake of simplicity of illustration. The upper portion of the suspension unit herein shown is entirely similar to that illustrated in FIG. 1.

Referring to FIG. 2a and sometimes back to FIG. 1, the piston 58 telescopically received in the cylinder 16 is formed with an axial bore which has an upper end open to the piston chamber 24 in the cylinder 16 and a lower end closed by the lower end wall 66 of the rod portion 62 of the piston 58 projecting axially downwardly from the opening 20a in the lower end wall 20 of the cylinder 16. The axial bore in the piston 58 consists of a first or lower bore section 146 closed at the lower end by the lower end wall 66 of the piston rod portion 62 and a second or upper bore section 148 having a lower end joining the upper end of the first or lower bore section 146 and an upper end open to the piston chamber 24 in the cylinder 16. The second or upper bore section 148 is larger in diameter than the first or lower bore section 146 and has its lower end defined by an annular face 150 of a radially outwardly stepped wall forming part of the piston rod portion 62. The piston rod portion 62 is formed with an internally threaded wall portion defining a lower end portion of the second or upper bore section 148. In the second or upper bore section 148 thus formed in the piston 58 are fixedly and closely received first and second or lower and upper cylindrical members 152 and 154. The first or lower cylindrical member 152 is formed with an externally threaded lower end wall portion and is screwed through the wall portion to the internally threaded wall portion of the piston rod portion 62. The first or lower cylindrical member 152 has a lower end wall 156 which is in close contact with the annular face 150 of the radially outwardly stepped wall of the piston rod portion 62 and which has an outer face defining the upper end of the first or lower bore section 146. The lower end wall 156 of the first or lower cylindrical member 152 is formed with a central opening 156a and a plurality of apertures 156b extending between the inner and outer faces of the end wall 156 for providing communication across the end wall 156. The first or lower cylindrical member 152 is formed with an axial bore 158 having a lower end defined by the inner face of the lower end wall 156 of the cylindrical member 152 and open at its upper end. The second or upper cylindrical member 154 is fixedly connected at its lower end to the upper open end of the first or lower cylindrical member 152. For this purpose, the first or lower cylindrical member 152 has an internally threaded inner peripheral wall defining a radially outwardly enlarged upper end section of the axial bore 158 in the cylindrical member 152 and the second or upper cylindrical member 154 has an externally threaded outer peripheral wall at its lower end portion so that the two cylindrical members 152 and 154 are conjoined or spigoted to each other through engagement between the internally and externally threaded wall portions of the members 152 and 154, respectively. The second or upper cylindrical member 154 has a lower end wall 160 which has an outer face defining the upper end of the axial bore 158 in the first or lower cylindrical member 152 and which is formed with a central opening 160a and a plurality of apertures 160b extending between the inner and outer faces of the end wall 160 and providing communication across the end wall 160. The second or upper cylindrical member 154 axially upwardly projects from the upper end of the piston 58 and has an upper end wall 162 which is formed with a central opening 162a and a plurality of apertures 162b extending between the inner and outer faces of the end wall 160. The second or upper cylindrical member 154 is thus formed with an axial bore 164 which extends between the inner faces of the lower and upper end walls 160 and 162 of the cylindrical member 154. The axial bores 158 and 164 in the first and second or lower and upper cylindrical members 152 and 154, respectively, and the first or lower bore section 146 in the piston rod portion 62 are all axially aligned with each other and have diameters which are substantially equal to each other. The central opening 156a in the lower end wall 156 of the first or lower cylindrical member 152 and the central openings 160a and 162a in the lower and upper end walls 160 and 162, respectively, of the second or upper cylindrical member 154 are all substantially aligned with each other in an axial direction of the piston 58. Furthermore, the axial bore 158 in the first or lower cylindrical member 152 has a length which is larger than the axial length of the first or lower bore section 146 in the piston rod portion 62 and smaller than the length of the axial bore 164 in the second or upper cylindrical member 154. The first or lower bore section 146 in the piston rod portion 62 and the axial bore 158 in the first or lower cylindrical member 152 and the axial bore 164 in the second or upper cylindrical member 154 are longer than each other in this sequence.

A first plunger 166 is axially slidably received in the first or lower bore section 146 in the piston rod portion 62 and has a rod portion 168 extending upwardly through the bore section 146 and axially slidably received in the central opening 156a in the lower end wall 156 of the first or lower cylindrical member 152. The first plunger 166 is thus axially movable in the bore section 146 between a lowermost position bearing against the inner face of the lower end wall 66 of the piston rod portion 62 and an uppermost position bearing against the outer face of the lower end wall 156 of the first or lower cylindrical member 152. The lower end wall 156 of the first or lower cylindrical member 152 thus serves as stop means for limiting upward movement of the first plunger 166. The length of the first plunger 166 is such that the rod portion 168 of the plunger 166 has its leading or upper end located substantially flush with the inner face of the lower end wall 156 of the first or lower cylindrical member 152 when the first plunger 166 is located in the lowermost position thereof with its lower end face in contact with the inner face of the lower end wall 66 of the piston rod portion 62. In the axial bore 158 of the first or lower cylindrical member 152 is axially slidably received a second plunger 170 which has a rod portion 172 upwardly extending through the axial bore 158 and axially slidably received in the central opening 160a in the lower end wall 160 of the cylindrical member 154. The second plunger 170 is axially movable in the bore 158 between a lowermost position seated on the inner face of the lower end wall 156 of the cylindrical member 152 and an uppermost position bearing against the outer face of the lower end wall 160 of the second or upper cylindrical member 154. The lower end wall 160 of the first or lower cylindrical member 152 thus serves as stop means for limiting upward movement of the second plunger 170. The second plunger 170 has a length such that the rod portion 172 of the plunger 170 has its leading or upper end located substantially flush with the inner face of the lower end wall 160 of the second or upper cylindrical member 154 when the second plunger 170 is held in the lowermost position thereof with its lower end face in contact with the inner face of the lower end wall 156 of the cylindrical member 152 as seen in FIGS. 2a and 2d. A third plunger 174 is axially slidably received in the axial bore 164 in the second or upper cylindrical member 154. The third plunger 174 has a rod portion 176 which extends upwardly through the axial bore 164 and which is axially slidably received in the central opening 162a in the upper end wall 162 of the cylindrical member 154. The third plunger 174 is axially movable in the axial bore 164 between a lowermost position seated on the inner face of the lower end wall 160 of the cylindrical member 154 and an uppermost position bearing against the inner face of the upper end wall 162 of the cylindrical member 154. The upper end wall 162 of the second or upper cylindrical member 154 thus serves as stop means for limiting upward movement of the third plunger 174. The rod portion 176 of the third plunger 174 upwardly projects from the upper end wall 162 of the second or upper cylindrical member 154 and carries at its leading or upper end the spring seat member 94 previously mentioned. On the spring seat member 94 is seated the lower end of the previously mentioned second preload spring 46 which is seated at the upper end on the self-levelling valve member 28 (FIG. 1). Designated by reference numerals 178, 180 and 182 are annular seal element which are received in circumferential grooves formed in the sliding wall portions of the first, second and third plungers 166, 170 and 174, respectively.

The rod portion 62 of the piston 58 is formed with first, second and third fluid passageways 184, 186 and 188 for directing working fluid into the first bore section 146 in the piston rod portion 62 and the axial bore 158 in the first or lower cylindrical member 152. The first fluid passageway 184 terminates at the lower end of the first or lower bore section 146 in the piston rod portion 62 for urging the first plunger 166 to move axially upwardly from the lowermost position thereof when fluid pressure is developed in the first fluid passageway 184. The second fluid passageway 186 terminates at the upper end of the first or lower bore section 146 in the piston rod portion 62 for urging the first plunger 166 to move axially downwardly, viz., toward the lowermost position thereof when fluid pressure is developed in the second fluid passageway 186. The fluid pressure developed in the upper axial portion of the bore section 46 in the piston rod portion 62 acts on the lower end face of the second plunger 170 through the apertures 156b formed in the lower end wall 156 of the first or lower cylindrical member 152 and urges the second plunger 170 to move axially upwardly from the lowermost position thereof. The third fluid passageway 188 terminates at the upper end of the axial bore 158 in the first or lower cylindrical member 152 for urging the second plunger 170 to move axially downwardly, viz., toward the lowermost position thereof when fluid pressure is developed in the third fluid passageway 188. The fluid pressure developed in the upper portion of the axial bore 158 in the first or lower cylindrical member 152 acts on the lower end face of the third plunger 174 and urges the third plunger 174 to move axially upwardly from the lowermost position thereof.

The first, second and third fluid passageways 184, 186 and 188 are in communication with fluid supply means adapted to be mechanically actuated by manually-operated control means. Though not shown in the drawing, the fluid supply means for use with the suspension unit illustrated in FIGS. 2a to 2d includes a four-position control valve having ports respectively leading to the first, second and third fluid passageways 184, 186 and 188. The manually-operated control means associated with the four-position control valve may be readily obtained by modifying the valve actuating mechanism shown in FIG. 1 in such a manner that the mechanism has four operative positions to enable the four-position valve to selectively direct the supplied working fluid to any of the first, second and third fluid passageways depending upon the height of the vehicle body desired.

When, now, no fluid pressure is developed in any of the first, second and third fluid passageways 184, 186 and 188, all of the first, second and third plungers 166, 170 and 174 are maintained in their respective lowermost positions as seen in FIG. 2a by the fluid pressure which acts downwardly on the third plunger 174 from the axial bore in the cylinder 16 through the apertures 162b in the upper end wall 162 of the second or upper cylindrical member 154. The suspension unit is consequently held in a first balanced condition supporting the vehicle body at a lowermost level over road surface.

When fluid pressure is developed in the first fluid passageway 184 in the absence of working fluid in the second and third fluid passageways 186 and 188, the first plunger 166 is upwardly moved from the lowermost position thereof until the plunger 166 is brought into abutting engagement with the outer face of the lower end wall 156 of the first or lower cylindrical member 152. With the first plunger 166 thus moved into the uppermost position thereof, the second and third plungers 170 and 174 are also moved upwardly from their respective lowermost positions so that the second and third plungers 170 and 174 are axially spaced apart from the inner faces of the lower end walls 156 and 160 of the first and second or lower or upper cylindrical members 152 and 154, respectively, by distances which are substantially equal to the axial displacement of the first plunger 166, as seen in FIG. 2b. Under these conditions, the first and second plungers 166 and 174 axially projects into the axial bores 158 and 164 in the first and second or lower or upper cylindrical members 152 and 154, respectively, over lengths which are substantially equal to the axial displacement of the first plunger 166 and, likewise, the third plunger 174 axially projects out of the upper end wall 162 of the second or upper cylindrical member 154 over a length larger than the outwardly projecting portion of the plunger 174 in the lowermost position by a length substantially equal to the axial displacement of the first plunger 166. The axial positions thus reached by the second and third plungers 170 and 174 are herein referred to as first axially raised positions. When the third plunger 174 is moved into the first axially raised position thereof, the suspension unit is brought into a second balanced condition by the action of additional working fluid introduced into the axial bore in the cylinder so that the vehicle body is raised from its lowermost normal position by a distance corresponding to the axial displacement of the first plunger 166.

If the working fluid is then discharged from the first fluid passageway 184 and is directed into the second fluid passageway 186, then the first plunger 166 is moved back into the lowermost position thereof bearing against the inner face of the lower end wall 66 of the piston rod portion 62 in the absence of fluid pressure in the first or lower bore section 146 in the rod portion 62. The fluid pressure developed into the second fluid passageway 186 acts upon the lower end face of the second plunger 170 through the apertures 156b formed in the lower end wall 156 of the first or lower cylindrical member 152 so that the second plunger 170 is upwardly moved from the first axially raised position until the plunger 170 is brought into abutting engagement with the outer face of the lower end wall 160 of the second or upper cylindrical member 154. The uppermost axial position thus achieved by the second plunger 170 is herein referred to as a second axially raised position of the plunger 170. With the second plunger 170 thus moved into the second axially raised position, the rod portion 172 of the second plunger 170 projects higher into the axial bore 164 in the second or upper cylindrical member 154 so that the third plunger 174 is upwardly moved from the first axially raised position over a distance which is substantially equal to the axial displacement of the second plunger 170 from the first axially raised position to the second axially raised position. The third plunger 174 is thus axially spaced apart from the inner face of the lower end wall 160 of the second or upper end wall 162 a distance which corresponds to the total axial displacement of the second plunger 170 from the lowermost position thereof, as will be seen from FIG. 2c. The axial position thus achieved by the third plunger 174 is herein referred to as a second axially raised position of the third plunger 174. With the third plunger 174 moved into the second axially raised position thereof, the suspension unit is extended from the second balanced condition into a third balanced condition having an axial length larger than the initial length of the unit in the first balanced condition by a length which corresponds to the axial displacement of the second plunger 170. The vehicle body is accordingly raised from the lowermost normal level by a distance substantially equal to the axial displacement of the second plunger 170 from the lowermost position thereof.

If the working fluid is then discharged from the second fluid passageway 186 and is directed into the third fluid passageway 188, the second plunger 170 is axially moved back into the lowermost position thereof by the fluid pressure downwardly acting thereon so that both of the first and second plungers 166 and 170 are held in the lowermost positions thereof as illustrated in FIG. 2d. The fluid pressure developed in the third fluid passageway 188 acts on the lower end face of the third plunger 174 through the apertures 160b formed in the lower end wall 160 of the second or upper cylindrical member 154 with the result that the third plunger 174 which has been held in the second axially raised position thereof is further moved upwardly until the plunger 174 is brought into abutting engagement with the inner face of the upper end wall 162 of the second or upper cylindrical member 154 as seen in FIG. 2d. The third plunger 174 now projects upwardly from the upper end wall 162 of the second or upper cylindrical member 154 over a length which is greater than the length of the third plunger 174 in the lowermost position thereof by a length which is substantially equal to the axial displacement of the third plunger 174. The suspension unit is in this manner brought into a fourth balanced condition from the third balanced condition and is operative to raise the vehicle body from the lowermost normal position thereof by a distance corresponding to the total axial displacement of the third plunger 174.

When the working fluid is then discharged from the third fluid passageway 188 and, instead, directed into the second fluid passageway 186, the second plunger 170 is for a second time moved upwardly from the lowermost position to the second axially raised position thereof with the first plunger 166 held in the lowermost position thereof and at the same time the third plunger 174 is moved downwardly from the uppermost position to the second axially raised position thereof by the fluid pressure downwardly acting on the third plunger 174 through the apertures 162b in the upper end wall 162 of the second or upper cylindrical member 154 in the absence of fluid pressure in the axial bore 164 in the cylindrical member 154, as illustrated in FIG. 2c. The suspension unit is thus contracted into the third balanced condition so that the vehicle body is lowered from the uppermost level by a distance corresponding to the downward displacement of the third plunger 174. If the working fluid is then discharged from the second fluid passageway 186 and introduced into the first fluid passageway 184, the second and third plungers 170 and 174 are downwardly moved from their second axially raised positions by the fluid pressure downwardly acting on the third plunger 174 in the absence of working fluid in the axial bore 158 in the first or lower cylindrical member 152 and, at the same time, the first plunger 166 is moved upwardly from the lowermost position thereof and holds the second and accordingly third plungers 170 and 174 in the first axially raised positions thereof, as seen in FIG. 2b. The suspension unit is thus further contracted into the second balanced condition and supports the vehicle body at the level which is higher than the lowermost normal level of the vehicle body a distance corresponding to the axial displacement of the second and third plungers 170 and 174 from the second axially raised positions to the first axially raised positions.

If the working fluid is discharged from the first fluid passageway 184 in the suspension unit which has thus been held in the second balanced condition, then all the plungers 166, 170 and 174 are downwardly moved into their respective lowermost positions thereof as illustrated in FIG. 2a so that the suspension unit is brought into the first balanced condition thereof, supporting the vehicle body in the lowermost normal position thereof.

Although the first and second cylindrical members 152 and 154 have been described as being constructed independently of each other and fixedly connected together, the two members may be formed integrally with each other or, if possible, with the piston 58. In this instance, the end wall 160 which has been assumed to form part of the lowermost portion of the second or upper cylindrical member 154 may be an intermediate lateral wall portion of the integral cylindrical member terminating at the lower and upper end walls 156 and 162.

From the foregoing description it will now be appreciated that, because of the fact that the height of a vehicle body is stepwise varied by selective displacement of a plurality of plungers which are arranged in series with each other in a direction of the suspension unit, the suspension unit has a sufficiently slender construction and is capable of accurately varying the level of the vehicle body without resort to strict control of the fluid pressure in the unit.

What is claimed is:

1. A hydro-pneumatic self-levelling suspension unit for an automotive vehicle comprising first and second cylindrical members which are telescopically connected together and which are axially movable relative to each other, self-levelling valve means disposed in said first cylindrical member and having a first position operative to direct fluid pressure into the first and second cylindrical members for causing the first and second cylindrical members to axially move relative to each other in directions to axially extend the suspension unit and a second position operative to discharge the fluid pressure from the first and second cylindrical members for causing the first and second cylindrical members to axially move relative to each other in directions to axially contract the suspension unit, resilient biasing means disposed in the first cylindrical member and engaging said valve means for biasing the valve means toward an equilibrium position between said first and second positions of the valve means thereby holding the suspension unit in a balanced condition, hydro-pneumatic spring means operative to compensate for fluctuations in the fluid pressure in said first cylindrical member, valve actuating means disposed in said second cylindrical member and engaging said resilient biasing means, said valve actuating means being stepwise extensible in an axial direction of said cylindrical member between a fully contracted length and a fully extended length for actuating said valve means through said resilient biasing means into said first position responsive to extension of said valve actuating means and into said second position responsive to contraction of the valve actuating means, said valve actuating means being biased toward said fully contracted length partly by said resilient biasing means and partly by the fluid pressure in the first and second cylindrical members, fluid supply means having a plurality of operative positions for supply working fluid to the valve actuating means and causing the valve actuating means to be selectively stepwise extended or contracted between said fully contracted length and said fully extended length, and manually-operated control means for manually actuating the fluid supply means selectively into any of said operative positions thereof.

2. A hydro-pneumatic self-levelling suspension unit, in which said valve actuating means comprise a plurality of plungers which are axially arrayed substantially in line with each other in the second cylindrical member and which are engageable end-to-end with each other, each of the plungers being axially movable between a first extreme position remotest from said self-levelling valve means and a second extreme position closest to the valve means, the plunger located closest to the valve means being connected to said resilient biasing means, said fully contracted length of the valve actuating means being achieved with all of the plungers held in the respective first extreme positions thereof and said fully extended length of said valve actuating means being achieved with the plunger remotest from said valve means held in the first extreme position thereof and the plunger closest to the valve means held in the second extreme position thereof, the plunger closest to the valve means being stepwise moved between the first and second extreme positions thereof by the fluid pressure developed in the valve actuating means by the working fluid directed to the actuating means from said fluid supply means, the working fluid from the fluid supply means being applied to at least one of the plungers which is selected depending upon the operative position selected in the fluid supply means.

3. A hydro-pneumatic self-levelling suspension unit as set forth in claim 2, in which said valve actuating means further comprise cylindrical wall means fast on said second cylindrical member and defining a plurality of axial bores which are axially arrayed substantially in line with each other in said second cylindrical member and in which said plungers are respectively axially slidable and lateral wall means including an apertured intermediate wall separating axially adjacent two of the axial bores from each other, a lateral end wall forming part of the second cylindrical member and defining an axial end of the axial bore located remotest from said self-levelling valve means and an apertured end wall defining an axial end of the axial bore located closest to said valve means, said walls providing stop means defining said first and second extreme positions of said plungers, said apertured intermediate wall being formed with an opening in which the plunger in remoter one of the adjacent two axial bores to said valve means is axially slidably received and engageable with the plunger in the other of the adjacent two axial bores, said apertured end wall being formed with an opening through which the plunger in the axial bore located closest to the valve means axially projects toward the valve means and connected to said resilient biasing means.

4. A hydro-pneumatic self-levelling suspension unit as set forth in claim 3, in which said valve actuating means further comprise wall portions formed with fluid passageways leading from said fluid supply means and including a first fluid passageway terminating at the axial end of the axial bore remotest from said self-levelling valve means for moving the plunger in the axial bore from the first extreme position to the second extreme position when the working fluid is directed into the first fluid passageway, and at least one second fluid passageway terminating intermediate between the axially adjacent two of said axial bores for moving the plunger in the remoter one of the two axial bores from the valve means from the second extreme position to the first extreme position thereof and simultaneously moving the plunger in the other of the two axial bores from the first extreme position toward the second extreme position thereof when the working fluid is directed into the second fluid passageway.

5. A hydro-pneumatic self-levelling suspension unit as set forth in claim 4, in which said self-levelling valve means comprise a valve member axially movable in said first cylindrical member between a first position directing the fluid pressure into the first and second cylindrical members and a second axial position discharging the fluid pressure from the first and second cylindrical members and in which said resilient biasing means comprise a first preload spring urging the valve member toward the first axial position thereof and a second preload spring urging the valve member toward the second axial position thereof against an opposing force of the first preload spring, said first and second preload springs being balanced with each other for urging the valve member toward an equilibrium position providing said equilibrium position of said valve actuating means, said first preload spring being seated at one end on said valve member and connected at the other end to the plunger in the axial bore closest to said valve member.

6. A hydro-pneumatic self-levelling suspension unit as set forth in claim 4, in which said fluid supply means comprise a source of fluid under pressure, and a control valve having a first operative position directing the working fluid into said first fluid passageway from the fluid source and a second operative position directing the working fluid to said at least one second fluid passageway from the fluid source.

7. A hydro-pneumatic suspension unit as set forth in claim 6, in which said manually operated control means comprise an elongate control member axially movable in an axial bore formed in a stationary member and formed with a plurality of recess corresponding in number to the number of operative positions of said fluid supply means and accordingly to the number of said plungers, a plurality of locking members received in said stationary member and engageable with said control member through any one of said recesses depending upon the axial position of the control member relative to the locking member, biasing means for urging the locking member against the control member and holding the locking member in locking engagement with the control member when the locking member is received in any of said recesses, and a control lever operatively connected to said control member and adapted to be manually operated to drive said control member to axially moved into an axial position having any of said recesses located to receive said locking member.

* * * * *